(12) United States Patent
Muhler et al.

(10) Patent No.: US 6,559,093 B2
(45) Date of Patent: May 6, 2003

(54) PROCESS FOR CATALYTIC AMMONIA PRODUCTION-PREPARATION AND RECOVERY OF AMMONIA SYNTHESIS CATALYST

(75) Inventors: Martin Muhler, Bochum (DE); Olaf Hinrichsen, Bochum (DE); Hubert Bielawa, Gelsenkirchen (DE); Claus J. H. Jacobsen, Jaegerspris (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/897,675

(22) Filed: Jul. 2, 2001

(65) Prior Publication Data

US 2002/0004451 A1 Jan. 10, 2002

(30) Foreign Application Priority Data

Jul. 6, 2000 (DK) .......................................... 2000 01052

(51) Int. Cl.$^7$ ............................. B01J 23/00; B01J 23/58
(52) U.S. Cl. ........................ 502/325; 502/328; 502/330; 502/302
(58) Field of Search .................................. 502/325, 328, 502/330, 302

(56) References Cited

U.S. PATENT DOCUMENTS

| | | | |
|---|---|---|---|
| 4,309,311 A | 1/1982 | Johnson et al. | 252/438 |
| 4,588,705 A | 5/1986 | Vanderspurt et al. | 502/177 |
| 4,698,325 A | 10/1987 | Andrew et al. | 502/330 |
| 5,336,655 A | 8/1994 | Basini et al. | 502/252 |
| 5,552,363 A * | 9/1996 | Pannell et al. | 502/337 |
| 5,756,421 A | 5/1998 | Choudhary et al. | 502/328 |

FOREIGN PATENT DOCUMENTS

| | | |
|---|---|---|
| DK | 507226 | 7/1991 |
| WO | WO 96/38222 | 12/1996 |

* cited by examiner

Primary Examiner—Mark L. Bell
Assistant Examiner—Patricia L. Hailey
(74) Attorney, Agent, or Firm—Dickstein Shapiro Morin & Oshinsky LLP

(57) ABSTRACT

A catalyst active in ammonia synthesis with improved activity and a process for the recovery of useful components from the catalyst.

2 Claims, No Drawings

PROCESS FOR CATALYTIC AMMONIA PRODUCTION-PREPARATION AND RECOVERY OF AMMONIA SYNTHESIS CATALYST

This invention relates to an improved catalyst active in ammonia production from ammonia synthesis gas. Furthermore, it relates to the recovery of useful catalytic components from a spent catalyst.

During the 20th century, the production of ammonia has increased dramatically to put ammonia among the most important industrial chemicals in terms of tonnage. Today, more than 1% of the global energy consumption is used for manufacture of ammonia in the classical Haber-Bosch process. Currently, the multi-promoted iron catalysts are by far the most important catalysts used industrially.

Recently, a promoted ruthenium (Ru) catalyst supported on carbon has been introduced into commercial operation. A general drawback of the ruthenium catalyst is the carbon support when used under industrial conditions, since all forms of carbon are susceptible to hydrogenation under these conditions. Hydrogenation results in a gradual loss of the carbon support by methane formation and eventually into severe operating difficulties. Consequently, support materials that are thermodynamically stable under the industrial ammonia synthesis conditions, i.e. at temperature between 300° C. and 500° C. and pressures above 50 bar ($50 \times 10^5$ kPa), can be expected to be important alternatives to the carbon support.

U.S. Pat. No. 4,309,311, which is incorporated herein by reference, discloses a catalyst for ammonia synthesis obtained by heating a composition of a cyano complex, at a temperature of approximately 325–430° C. This catalyst is based on an alkali metal or alkaline earth metal hexacyanoruthenate on a support of, for example, magnesia. The activated form of this catalyst is the salt of the cyanocomplex, and the nature of the support is not stated as having any particular significance.

U.S. Pat. No. 4,588,705 discloses a gel or suspension for multiple purposes, amongst others ammonia production, which is based on a mixture of a cyano-containing anionic complex having a reducible transition metal and a non-reducible metal, with one or more solutions containing polyvalent metal ions.

U.S. Pat. No. 4,698,325 discloses a catalyst for the preparation of ammonia. Examples of catalyst precursors are shown, the precursors being based on a fused mixture of oxides containing 0.3% w/w magnesia and using a promoter of an alkali metal salt of ruthenium.

Various ruthenium-containing catalysts for use in other processes such as production of synthesis gas are mentioned in, for instance, U.S. Pat. Nos. 5,756,421 and 5,336,655, and SE 507,226.

The patent disclosures mentioned above are all incorporated herein by reference.

Since ruthenium-based ammonia synthesis catalysts are much more expensive than iron-based catalysts it is essential to ensure optimal usage of the ruthenium in the catalyst. Therefore, the accessible surface area of such a ruthenium catalyst must be suitable to give a high catalytic activity and a long operation time of the catalyst. Furthermore, it is essential that ruthenium can be recovered from the catalyst at a low cost to enable recycling of the ruthenium metal.

Lately, we have investigated the use of a support material, which allows the preparation of a catalyst with a high dispersion of Ru and easy recovery of both Ru as well as the necessary promoters. We have found that in this respect (and with respect to susceptibility to hydrogenation as previously mentioned) magnesium oxide (MgO) is a very desirable support. Previously, MgO supported promoted Ru catalysts active in ammonia synthesis have been reported in the literature.

We have found that a MgO supported promoted Ru catalyst exhibits unexpectedly much higher catalytic activity in ammonia production from ammonia synthesis gas compared to those reported earlier, when the catalyst support has a specific area of above 40 $m^2/g$ and the ruthenium content of the catalyst is between 3 wt % and 20 wt % and the promoter content is between 0.2–0.5 mole of ruthenium. Furthermore, a process was found to be suitable for the recovery of useful catalytic components, especially for the recovery of ruthenium from spent catalyst.

Accordingly, it is an object of the invention to provide a catalyst for the synthesis of ammonia.

It is another object of the invention to provide an ammonia synthesis catalyst exhibiting higher catalytic activity than those previously known.

Furthermore, it is an object of the invention to provide a catalyst containing catalytic compounds which can easily be recovered from the spent catalyst.

Finally, it is an object of the invention to provide a process for the recovery of catalytic components from the ammonia synthesis catalyst.

It is the general perception that there is a proportionality relation between the activity (moles of ammonia produced/g of catalyst) and the catalyst content of ruthenium, in the group of catalysts in question. By the present invention the activity of the catalyst was increased by a factor 10–20, while the Ru content was increased by a factor 1.5–8.

Thus, the invention provides a catalyst active in ammonia synthesis with improved activity. The invention also provides a process for the recovery of useful catalytic components from the catalyst, i.e.

I) a solution of dissolved hydroxides of the promoter components,
II) a solution of a dissolved magnesium compound, and
III) ruthenium metal.

It was further found that the activity of a catalyst according to the invention is improved at operating conditions, where the ammonia concentration is high and/or where the composition of the synthesis gas is low in hydrogen compared to stoichiometry of the ammonia formation reaction scheme.

In industrial applications this increased activity has several advantages. Significantly improved catalyst activity allows use of a correspondingly smaller synthesis converter or alternatively use of a lower synthesis pressure without lowering the ammonia production rate.

EXAMPLE 1

Preparation of Ruthenium Catalyst

MgO support is purchased from Johnson-Matthey (purity 99.9955%, surface area 51.3 $m^2/g$). Ruthenium is introduced onto the support either by impregnation of the support with $Ru_3(CO)_{12}$ in tetrahydrofurane or by chemical vapour deposition (CVD) of $Ru_3(CO)_{12}$. Alternatively, ruthenium can be impregnated using a suitable salt such as $RuCl_3$ in a non-aqueous solvent. After drying of the impregnated catalyst to remove the solvent or directly using the CVD deposited $Ru_3(CO)_{12}/MgO$ the catalyst is activated by treatment with hydrogen. The activation is conducted at a space velocity of 30000 $h^{-1}$ and a heating ramp of 0.1° C./min until 550° C. is reached, where the catalyst is held for 12 hours and cooled to room temperature. The catalyst is slowly exposed to ambient conditions (passivation) to minimise oxidation of the small Ru crystals. The activation can also be conducted in nitrogen-hydrogen-ammonia mixtures. Suitable Ru concentrations range from 3 to 20 wt % Ru.

EXAMPLE 2

Promotion of Catalyst

The catalyst from Example 1 prepared by CVD of $Ru_3(CO)_{12}$ onto MgO followed by activation in hydrogen and passivation is promoted by impregnation of a suitable promoter salt in non-aqueous solution. Suitable promoters are alkali metals, alkaline earth metals, lanthanides and combinations of these. Carbonates, hydroxides and nitrates are among suitable counter ions in the impregnation of the promoter salts. The counter ions can be removed in a separate reduction process as described in Example 1, or they can be directly introduced into the catalytic converter. The optimum content of the promoters depends on the Ru concentration and dispersion but range between 0.2–5.0 moles of promoter for each mole of ruthenium.

EXAMPLE 3

Testing of Catalyst

The promoted Ru/MgO catalyst is transferred to the set-up used for catalytic activity measurements. The catalyst is heated to the desired test temperature, typically 400° C., and the pressure increased to the desired test pressure, typically 100 bar ($100 \times 10^5$ kPa). A known mixture of hydrogen-nitrogen and optionally ammonia is passed over the catalyst bed at the desired space velocity, typically 30000 $h^{-1}$, and the ammonia concentration in the exit is determined. By systematically varying the temperature, pressure, space velocity, and ammonia inlet concentration the catalyst performance is evaluated at relevant conditions, i.e. at temperatures of 300–550° C., pressures between 10 and 140 bar ($10-140 \times 10^5$ kPa), space velocities between 10000 and 100000 $h^{-1}$ and inlet concentrations of ammonia of 0–20 vol %.

EXAMPLE 4

Recovery of Catalyst Promoters, Ru and Mg Nitrate From Spent Catalyst

After testing, the catalyst is passivated as described in Example 1. Then the catalyst is washed with a basic solvent consisting of aqueous 1 M ammonia. It is possible to quantitatively (>97%) recover the promoters without contamination with ruthenium or magnesium. The wash-water may be evaporated to dryness to isolate the promoter hydroxides. The catalyst remaining from the ammonia wash is heated to 70° C. in an acidic solvent consisting of excess 1 M nitric acid. In this way the magnesium oxide support is transformed into a solution of magnesium nitrate, which can be separated from the remaining ruthenium metal either by centrifugation or filtration. In this way more than 94% Ru can be recovered. The magnesium nitrate is very pure and can be used for production of other magnesium salts or converted into the oxide e.g. via the carbonate.

EXAMPLE 5

Activity of Single-promoted Ru-catalyst

A catalyst prepared according to Examples 1–3 containing 4.1 wt % Ru and 6 wt % Ba is 5 times as active as the conventional multi-promoted iron catalyst, KM1.

EXAMPLE 6

Activity of Double-promoted Ru-catalyst

A catalyst prepared according to Examples 1–3 containing 3.8 wt % Ru, 5.8 wt % Ba and 4.1 wt % Cs was tested in an isothermal converter operating at a temperature of 400° C. and a pressure of 100 bar ($100 \times 10^5$ kPa) on an ammonia synthesis gas with a ratio of $H_2/N_2$ of 3:1 and a space velocity of ca. 30000 $h^{-1}$. The catalyst exhibits more than 5 times the activity of a conventional multi-promoted catalyst, KM1 (commercially available from Haldor Topsøe A/S) on a volume basis.

What is claimed is:

1. Ammonia synthesis catalyst comprising as catalytically active metal ruthenium, promoted with one or more components selected from the groups of alkali metals, alkaline earth metals and lanthanides, the catalytically active metal being supported by a magnesium oxide material, wherein the magnesium oxide material has a specific surface area of at least 40 $m^2/g$, the ruthenium concentration is between 3 wt % and 20 wt % and the promoter content is between 0.2–5.0 mole of promoter per mole of ruthenium.

2. Ammonia synthesis catalyst according to claim 1, wherein the promoters are cesium and/or barium.

* * * * *